US010468952B2

(12) United States Patent
Tremelling et al.

(10) Patent No.: US 10,468,952 B2
(45) Date of Patent: Nov. 5, 2019

(54) PERMANENT MAGNET MACHINE WITH HYBRID CAGE AND METHODS FOR OPERATING SAME

(71) Applicants: ABB Research Ltd., Zurich (CH); Darren Dale Tremelling, Apex, NC (US); Wen Ouyang, Apex, NC (US)

(72) Inventors: Darren Dale Tremelling, Apex, NC (US); Wen Ouyang, Apex, NC (US)

(73) Assignee: ABB Schweiz AG, Baden (CH)

( * ) Notice: Subject to any disclaimer, the term of this patent is extended or adjusted under 35 U.S.C. 154(b) by 794 days.

(21) Appl. No.: 14/650,857

(22) PCT Filed: Nov. 20, 2013

(86) PCT No.: PCT/US2013/071109
§ 371 (c)(1),
(2) Date: Jun. 9, 2015

(87) PCT Pub. No.: WO2014/092957
PCT Pub. Date: Jun. 19, 2014

(65) Prior Publication Data
US 2015/0318774 A1 Nov. 5, 2015

Related U.S. Application Data

(60) Provisional application No. 61/737,724, filed on Dec. 14, 2012.

(51) Int. Cl.
*H02K 21/46* (2006.01)
*H02K 21/04* (2006.01)
*H02K 11/042* (2016.01)

(52) U.S. Cl.
CPC .......... *H02K 21/042* (2013.01); *H02K 21/46* (2013.01); *H02K 11/042* (2013.01); *H02K 2213/06* (2013.01)

(58) Field of Classification Search
CPC .......... H02K 21/46; H02K 1/223; H02K 1/27; H02K 21/046
(Continued)

(56) References Cited

U.S. PATENT DOCUMENTS 1,079,332 A 11/1913 Fynn
4,127,786 A 11/1978 Volkrodt
(Continued)

FOREIGN PATENT DOCUMENTS

CN 102611216 A 7/2012
DE 10060121 A1 6/2002
(Continued)

OTHER PUBLICATIONS

International Search Report and Written Opinion for Application No. PCT/US2015/020820 dated Jun. 23, 2015.
(Continued)

*Primary Examiner* — Bernard Rojas
(74) *Attorney, Agent, or Firm* — Taft Stettinius & Hollister LLP; J. Bruce Schelkopf

(57) ABSTRACT

A permanent magnet machine with a hybrid cage and methods for operating same are disclosed. According to one aspect, the subject matter described herein includes a rotor and hybrid cage for an electrical machine, the rotor comprising a rotor body having a central axis and including a plurality of permanent magnets positioned to create a plurality of rotor magnetic poles distributed around a peripheral surface of the rotor. The rotor also includes a hybrid cage that includes conductive loops around each of the rotor magnetic poles, where the conductive loops are controllable to form a closed circuit or an open circuit around each of the rotor magnetic poles. A closed circuit may be created when a magnetic field having a field strength or change of field strength that exceeds a threshold magnitude is present, such
(Continued)

as during a fault condition, and an open circuit may be created when a magnetic field having a field strength or change of field strength that exceeds a threshold magnitude is not present, such as during normal operation.

27 Claims, 13 Drawing Sheets

(58) Field of Classification Search
USPC ........................................ 310/156.74–156.78
See application file for complete search history.

(56) References Cited

U.S. PATENT DOCUMENTS

| | | | |
|---|---|---|---|
| 4,139,790 A | 2/1979 | Steen | |
| 4,405,873 A | 9/1983 | Nondahl | |
| 4,469,970 A | 9/1984 | Neumann | |
| 4,506,181 A | 3/1985 | Jones et al. | |
| 4,830,412 A * | 5/1989 | Raad | H02K 21/46 290/31 |
| 2002/0084710 A1 | 7/2002 | Worley et al. | |
| 2005/0134137 A1* | 6/2005 | Sweo | B22C 9/04 310/211 |
| 2006/0103251 A1 | 5/2006 | Taniguchi et al. | |
| 2006/0290316 A1 | 12/2006 | Seguchi et al. | |
| 2009/0200885 A1 | 8/2009 | Kikuchi et al. | |
| 2010/0011806 A1* | 1/2010 | Nam | F04C 18/3564 62/510 |
| 2011/0285339 A1 | 11/2011 | Hyde et al. | |
| 2013/0049910 A1 | 2/2013 | Tanaka et al. | |
| 2013/0278104 A1 | 10/2013 | Komuro et al. | |
| 2014/0116286 A1* | 5/2014 | Huh | H02K 29/12 105/49 |
| 2015/0236575 A1* | 8/2015 | Walsh | H02K 21/46 310/156.07 |

FOREIGN PATENT DOCUMENTS

| | | |
|---|---|---|
| EP | 678 967 | 10/1995 |
| EP | 2 237 389 A2 | 10/2010 |
| EP | 2 237 390 A2 | 10/2010 |
| GB | 677956 A | 8/1952 |
| JP | 2010-213516 A | 9/2010 |
| JP | 2011-041433 A | 2/2011 |
| WO | WO 00/01058 | 1/2000 |
| WO | WO 01/06624 | 1/2001 |
| WO | WO 2012/098737 A1 | 7/2012 |
| WO | WO 2015/183379 A1 | 12/2015 |

OTHER PUBLICATIONS

Peralta-Sanchez et al., "Steady-State Analysis of a Canned Line-Start PM Motor," IEEE Transactions on Magnetics, vol. 47, No. 10, pp. 4080-4083 (Oct. 2011).

Peralta-Sanchez et al., "Line-Start Permanent-Magnet Machines Using a Canned Rotor," IEEE Transactions on Industry Applications, vol. 45, No. 3, pp. 903-910 (2009).

Takahashi et al., "Transient-Torque Analysis for Line-Starting Permanent-Magnet Synchronous Motors," Proceedings of the 2008 International Conference on Electrical Machines, IEEE, pp. 1-6 (2008).

Popescu et al., "Line-Start Permanent-Magnet Motor: Single-Phase Starting Performance Analysis," IEEE Transactions on Industry Applications, vol. 39, No. 4, pp. 1021-1030 (2003).

Kim et al., "High performance NdFeB magnets (invited)," J. Appl. Phys. vol. 79, No. 8, pp. 5035-5039 (Apr. 15, 1996).

Kim et al., "Effect of Minor Grain Boundary Additives on the Magnetic Properties of NdFeB Magnets," IEEE Transactions on Magnetics, vol. 31, No. 6, pp. 3620-3622 (Nov. 1995).

Miller, "Single-Phase Permanent-Magnet Motor Analysis," IEEE Transactions on Industry Applications, vol. IA-21, No. 4, pp. 651-658 (1985).

Miller, "Synchronization of Line-Start Permanent-Magnet AC Motors," IEEE Transaction on Power Apparatus and Systems, vol. PAS-103, No. 7, pp. 1822-1828 (Jul. 1984).

Notification of Transmittal of the International Search Report and the Written Opinion of the International Searching Authority, or the Declaration for International Application No. PCT/US2013/071109 (dated Dec. 22, 2014).

"Phase Control Thyristors (Stud Version), 330 A," ST330SPbF Series, www.vishay.com, pp. 1-6 (Aug. 11, 2008).

"TO-209AE (TOo-118)", Outline Dimensions, www.vishay.com, pp. 1-2 (Aug. 2, 2007).

"Magnaplus Generator 280—430 Frame Installation, Operation, and Maintenance Manual," Marathon Electric Mfg. Corp., http://www.zonge.com/PDF_TxManuals/SB504z.pdf, pp. 1-23 (May 2006).

Rahman et al., "Promising Applications of Neodymium Boron Iron Magnets in Electrical Machines," IEEE Transactions on Magnetics, vol. 21, No. 5, pp. 1712-1716 (Sep. 1985).

"Synchronous Machines," TECO-Westinghouse, pp. 1-12 (Publication Date Unknown).

"Technical Data Sheet," Integrated Magnetics, http://www.intemag.com/uploads/Rare%20Earth%20Magnets%20Data%20Book/Neodymium%20Single%20Sheets/N3917.pdf, p. 1 (Publication Date Unknown).

* cited by examiner

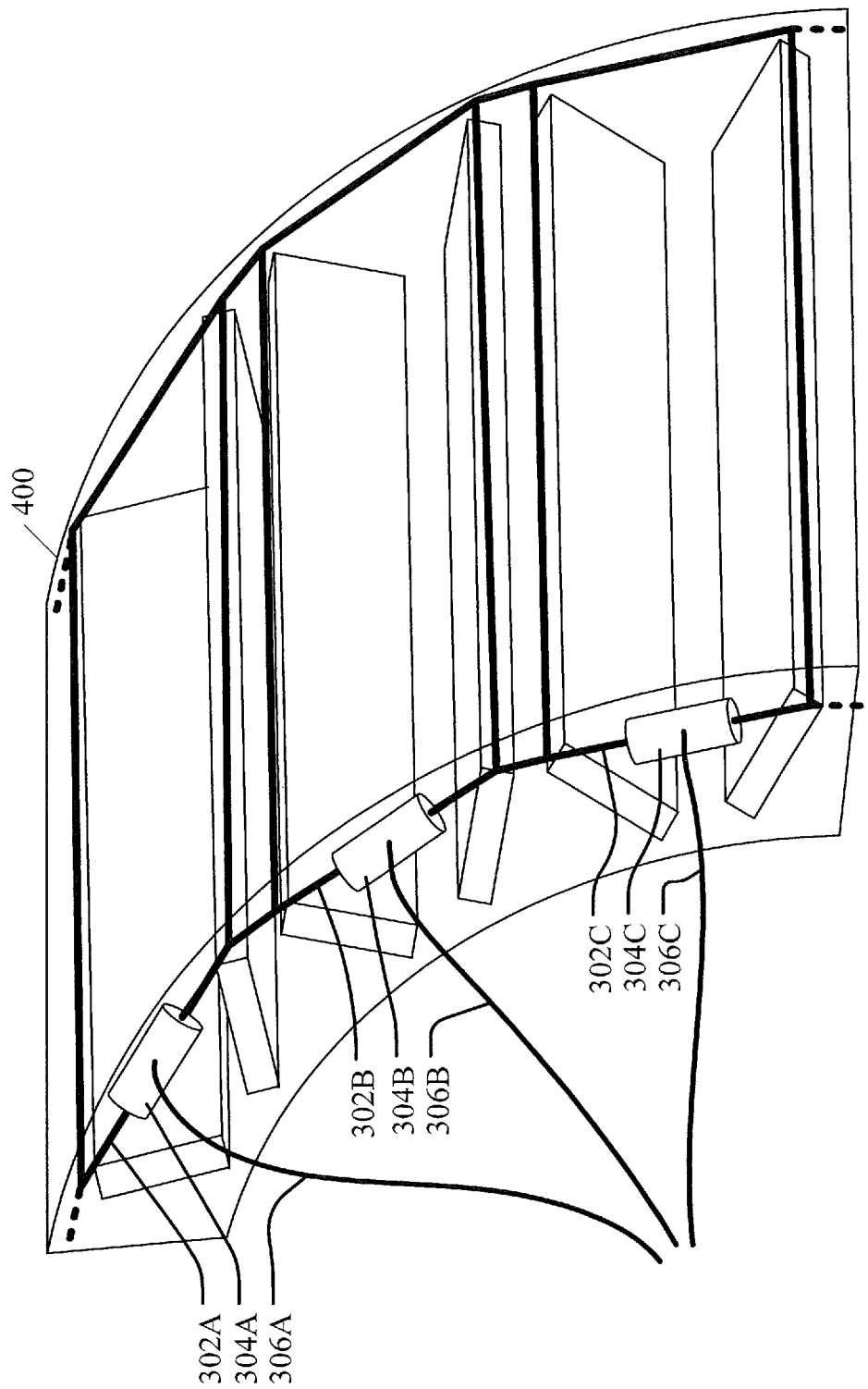

US 10,468,952 B2

PERMANENT MAGNET MACHINE WITH HYBRID CAGE AND METHODS FOR OPERATING SAME

PRIORITY CLAIM

This application claims the benefit of U.S. Provisional Patent Application Ser. No. 61/737,724 filed Dec. 14, 2012; the disclosure of which is incorporated herein by reference in its entirety.

TECHNICAL FIELD

The subject matter described herein relates to permanent magnet machines. More particularly, the subject matter described herein relates to permanent magnet machines having a hybrid cage and methods for operating same.

BACKGROUND

Brushless permanent magnet (PM) machines use a rotor in which permanent magnets are embedded, arranged so that multiple magnetic poles project from the rotor radially, axially or transversely. The stator contains electromagnets which generate magnetic poles that move around the perimeter of the stator. The attraction and repulsion of the moving poles created by the current through the stator windings to the magnetic poles created by the PMs embedded within the rotor create torque.

Induction motors, on the other hand, don't include magnets on the rotor but instead include loops of conductors, e.g., "coils". In the presence of the moving poles created by flux created by current through the stator windings, the changing magnetic flux generated by the stator windings induce currents in the conducting loops, which gives rise to opposing magnetic fields. The attraction and repulsion between the moving stator fields and the magnetic fields induced on the rotor coils create torque. Because the topology of the loops of coils located around the rotor resembles a squirrel cage in common construction, the conductive structure is commonly referred to as a "cage".

Some machines use permanent magnets on the rotor but also include a cage structure to provide additional torque at start-up. For example, these machines may be called line start permanent magnet machines. Also, field wound synchronous machines commonly have loops of conductive material that circumscribe and surround the poles of the rotor, to aid startup of the machine, as well as dampen transient behavior on the machine and electrical network. The additional magnetic fields produced by the cage(s) is(are) proportional to the current in the cage loops, which is proportional to the change of flux imposed on the cage loop. When there is large relative difference in speed between rotor and stator fields, the change in magnetic flux seen by a cage loop is relatively high, which induces a relatively large current and produces a relatively large opposing magnetic pole. The stronger magnetic attraction and repulsion that is created between the magnetic poles of the rotor and the magnetic poles of the stator manifests itself as additional torque. The resultant torque tends to force the rotor and stator to synchronize in speed. As the relative speed between rotor and stator decreases, the current induced in the cage loops becomes smaller, as does the additional magnetic flux contributed by the cage. If the speed of the rotor is synchronous to that of the fields created by the stator windings, the current in the cage(s) becomes zero, and the cage stops providing the benefit of additional magnetic flux, as well as torque that would restore synchronism between stator and rotor. At this point, the rotor is operating using only the attraction and repulsion between the PMs on the rotor and the moving poles created by the stator windings.

While a wound field synchronous machine may be directly connected the power network without an intermediate power electronic converter, a PM machine without a cage requires a power electronic converter. This power electronic converter acts as a medium between the fixed amplitude and frequency of the power network and that of the voltage amplitude and frequency of the synchronous machine being driven, so that the mechanical system being driven by the motor or generator may be controlled in an effective manner. (The control of the field current in the wound field synchronous machine allows control of the amplitude of the stator voltage, the permanent magnet machine does not allow this type of control.)

A drawback of the power electronic converter is that there tends to exist variations in the current waveforms between the converter and machine being driven. These variations in the current waveforms will no longer allow the poles of the stator and of the rotor to rotate in a synchronous manner. These variations in current are often called time harmonics, and will create losses and torque pulsations in the machine. The torque pulsations may be reduced by providing the rotor pole with a conducting cage. While the conductive cage acts to dampen torque pulsations, the resultant currents which create the damping torques in the cages create losses, which are not preferred under normal operation.

Due to these losses, cages are not preferred in PM machines, as the magnets are quite sensitive to the temperature rise from the losses. The magnets are selected based on temperature and field requirements. Magnets that are capable of operating at higher temperatures and lower fields are more expensive, and have lower remanence, due to the inclusion of Dysprosium, in particular. In this way, it is preferred to have a rotor that is cooler or protects the magnets from low field levels. The low field levels are not usually a difficulty when under normal operation, but become limiting when a transient event occurs, such as a short circuit.

There are a number of advantages to having a combination of permanent magnet and cage. For example, a cage can moderate the effects of sudden changes of magnetic flux, i.e., flux linkage, and thus can smooth changes in rotor speed, dampen the effects of ripple currents in the stator windings, etc. For line-start synchronous machines, the cage provides additional torque during startup. There are disadvantages to having a cage, as well. The presence of a cage induces a loss that reduces the efficiency of a PM machine and results in non-trivial rotor heating. Because of this, brushless PM machines typically do not include a cage of any kind.

FIG. 1A is a section of a rotor of a conventional permanent magnet electrical machine without a protective cage. Rotor 100 contains permanent magnets 102 embedded within the rotor body to create a pattern of alternating north (N) and south (S) magnetic poles around the outer diameter of the rotor. In the conventional rotor 100 shown in FIG. 1A, the magnets are positioned so that the magnetic field produced by each magnet has a vector that is normal to the outer surface of rotor 100.

FIG. 1B is a section of another rotor of a conventional permanent magnet electrical machine without a protective cage. In the conventional rotor 100 shown in FIG. 1B, permanent magnets 102 are arranged in pairs to produce a pattern of alternating north (N) and south (S) magnetic poles around the outer diameter of the rotor. Each pair of magnets is arranged in a V shape such that the magnetic field produced by each pair has a vector that is normal to the outer surface of rotor 100.

Because neither of the conventional rotors shown in FIGS. 1A and 1B include a conducting cage structure, the permanent magnets contained within these conventional rotors are susceptible to damage in response to being subjected to low magnetic flux density in the magnetized direction, such as may occur during startup conditions or during fault conditions. However, a large change in magnetic flux induces voltage in and around the rotor, which when constructed with conductive elements, allow significant currents to flow, which act to create a countervailing magnetic flux and thus protect the permanent magnet from being demagnetized. The eddy currents within the body of the magnet tend to be smaller than the eddy currents at the periphery of the magnet, and due to geometry and magnetic fringing, the countervailing magnetic flux within the body of the magnet tends to be larger than the countervailing magnetic flux at the periphery of the magnet. As a result, the periphery of the magnet has less protection that the rest of the magnet body, and thus the edges of the magnet tend to suffer more demagnetization than is suffered by the core of the magnet. A coupled effect is that the eddy currents create significant additional losses, and within the short circuit time frame, this energy does not propagate throughout the magnet, so the periphery of the magnet exhibits significant temperature rise.

FIG. 2A is a cross section of a rotor 100 having magnets 102 arranged in a V shape showing damage caused by exposure of the magnets to strong magnetic fields. A stator 200 has coils 202 for generating a set of moving magnetic poles. FIG. 2A shows that a portion of magnets 102 have been demagnetized as a result of exposure to large changes of magnetic flux. The shaded portions 204 indicate parts of the magnet that tend to become demagnetized easier than other regions. Magnets that include NdFeB, Ferrite, SmCo, or Alnico, for example, are susceptible to such demagnetization.

FIG. 2B is a graph that illustrates the conditions upon which a magnet becomes demagnetized, shown as an inflection point, or "knee" in the graph. The point at which demagnetization occurs depends upon temperature of the magnet, and the flux density that passes through the magnet. The presence of a cage allows for a minimization that in the reduction of flux density in the magnet that occurs during transient type events, specifically an accidental or purposeful short circuit of one or more of the stator windings. The machine design may be so that under normal operation, the magnet operating point of 110 [C] and 0.4 [T] is obtained. Without a cage, the flux density in portions of the magnet may be reduced to 0.0 [T], for example. As the flux density at 110 [C] is below the knee of about 0.19 [T], these portions of the magnet that fall below the knee are demagnetized. The presence of a cage prevents the flux density from falling below the knee, thus preventing the demagnetization of the magnet.

Some conventional electric machines, such as synchronous machines for example, include cage structures. If the conducting cage is a closed circuit that surrounds the magnetic pole created by the permanent magnet, a change in magnetic flux linked in that cage induces a current in the loop, which creates its own countervailing magnetic field.

Thus, a PM electrical machine with a conductive cage has greater protection from damage to the permanent magnets caused by changes in magnetic flux, but suffers a loss of efficiency during normal operation. A PM electrical machine without a conductive cage has greater efficiency during normal operation, but is susceptible to damage to the permanent magnets during startup or fault conditions.

Accordingly, in light of these disadvantages associated with both machines with cages and machines without cages, there exists a need for PM machines with cages that can be controlled such that the cage conducts when needed and does not conduct when needed, i.e., PM machine with a hybrid cage and methods for operating same.

SUMMARY

According to one aspect, the subject matter described herein includes a rotor and hybrid cage for a permanent magnet electrical machine, the rotor comprising a rotor body having a central axis and including a plurality of permanent magnets positioned to create a plurality of rotor magnetic poles distributed around a peripheral surface of the rotor. The rotor also includes a hybrid cage that includes conductive loops around each of the rotor magnetic poles, where the conductive loops are controllable to form a closed circuit or an open circuit around each of the rotor magnetic poles.

According to another aspect, the subject matter described herein includes a permanent magnet electrical machine with a hybrid cage. The machine includes a stator having a central axis and a plurality of windings for generating a rotating field of stator magnetic poles, and a rotor having a central axis which coincides with the central axis of the stator, the rotor including a plurality of permanent magnets positioned to create a plurality of rotor magnetic poles distributed around a peripheral surface of the rotor. The rotor also includes a hybrid cage that includes conductive loops around each of the rotor magnetic poles, where the conductive loops are controllable to form a closed circuit or an open circuit around each of the rotor magnetic poles.

According to another aspect, the subject matter described herein includes a method for operating a permanent magnet electrical machine with a hybrid cage. The method includes providing, at an electrical machine that includes a rotor having a plurality of permanent magnets positioned to create a plurality of rotor magnetic poles distributed around a peripheral surface of the rotor, a hybrid cage comprising conductive loops around each of the rotor magnetic poles, wherein the conductive loops are controllable to form a closed circuit or an open circuit around each of the rotor magnetic poles. The method also includes controlling the conductive paths to form a closed circuit around each of the rotor magnetic poles in response to the presence of a magnetic field having a field strength that exceeds a threshold magnitude, and controlling the conductive paths to form an open circuit around each of the rotor magnetic poles in response to the absence of a magnetic field having a field strength that exceeds a threshold magnitude.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIGS. 4A and 4B illustrate sections of exemplary rotors for a permanent magnet electrical machine with a hybrid cage according to other embodiments of the subject matter described herein;

DETAILED DESCRIPTION

In accordance with the subject matter disclosed herein, permanent magnet machines having a hybrid cage and methods for operating same are provided.

Reference will now be made in detail to exemplary embodiments of the present invention, examples of which are illustrated in the accompanying drawings. Wherever possible, the same reference numbers will be used throughout the drawings to refer to the same or like parts.

In order to have the benefits that the presence of a cage structure provides and also have the benefits that the absence of a cage structure provides, a hybrid cage structure is hereby presented, in which the conductive paths of the cage are controllable to form a closed circuit or an open circuit. When the conductive paths of the cage form a closed circuit, the hybrid cage operates to protect the rotor permanent magnets from damage. When the conductive paths of the cage form an open circuit, the hybrid cage does not reduce the efficiency of the machine in normal operation.

Figure 1A:
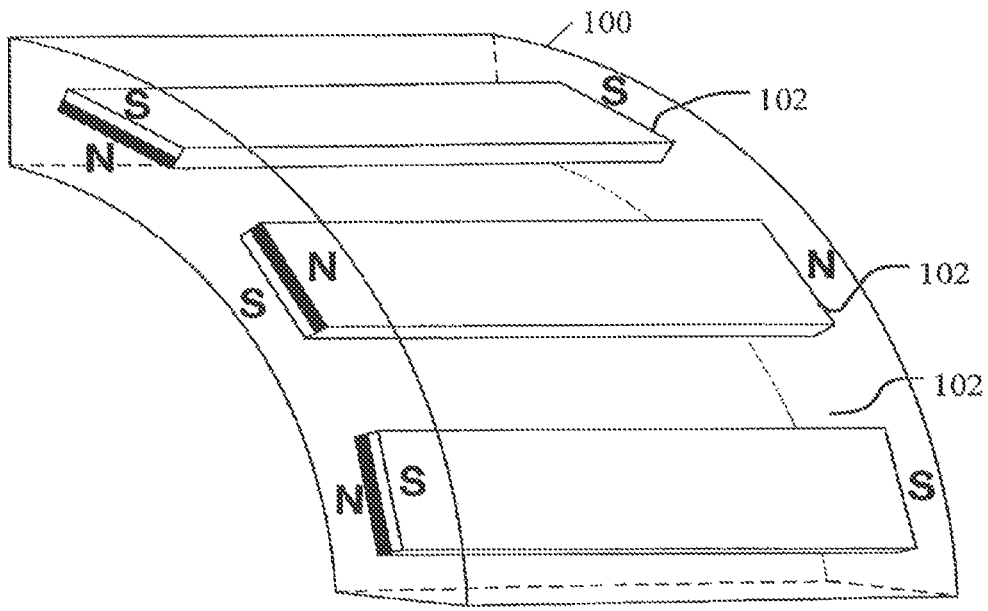
FIGS. 1A and 1B are sections of rotors of a conventional permanent magnet electrical machine without a protective cage.
Figure 1B:
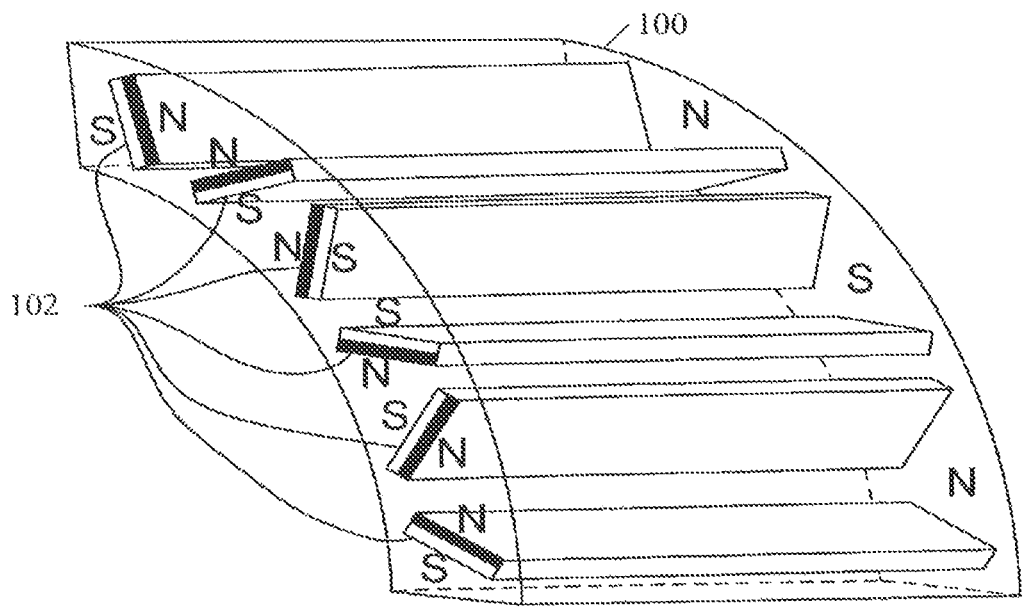
Figure 2A:
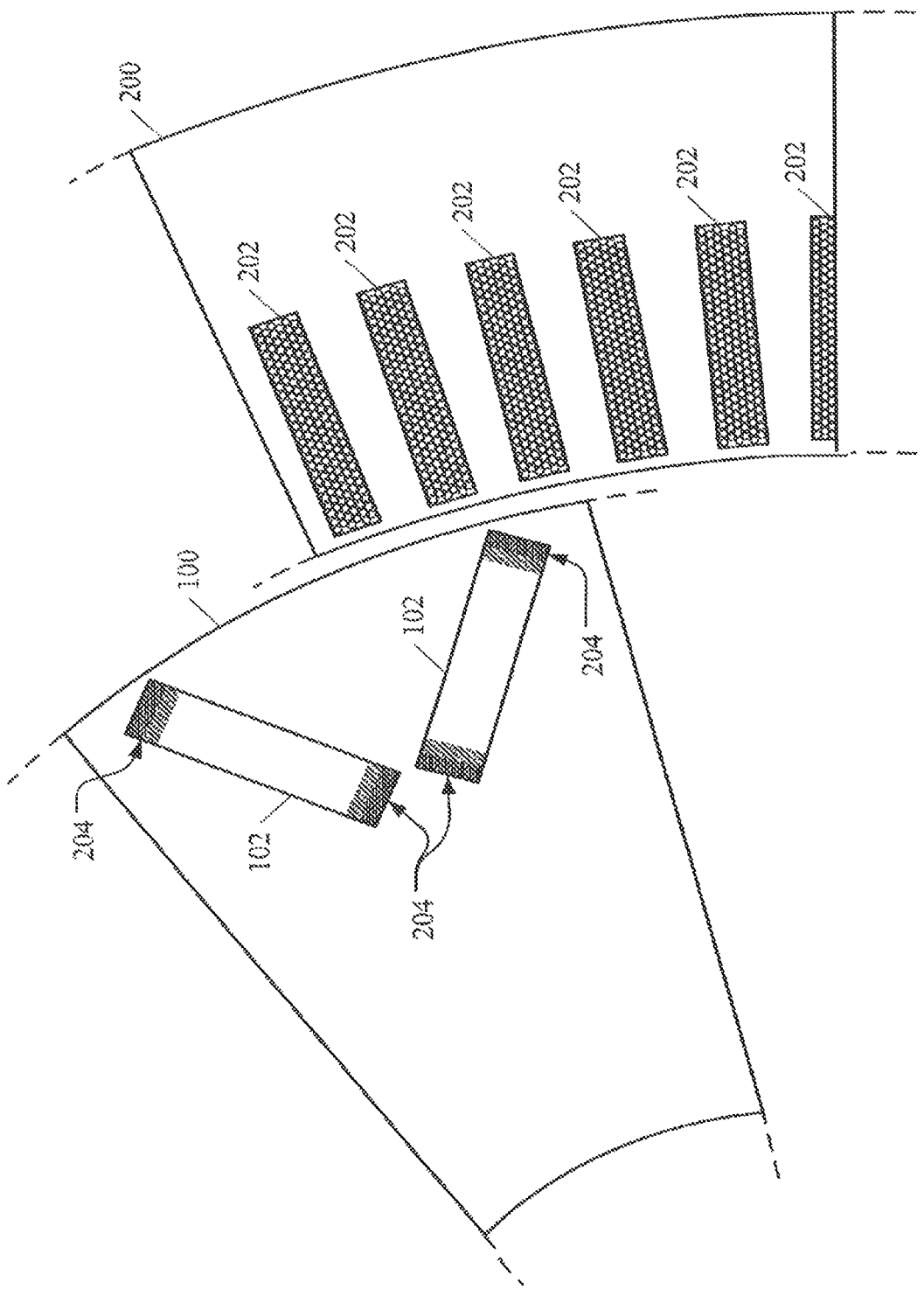
FIG. 2A is a cross section of a rotor showing damage to the rotor permanent magnets caused by exposure of the magnets to strong magnetic fields.
Figure 2B:
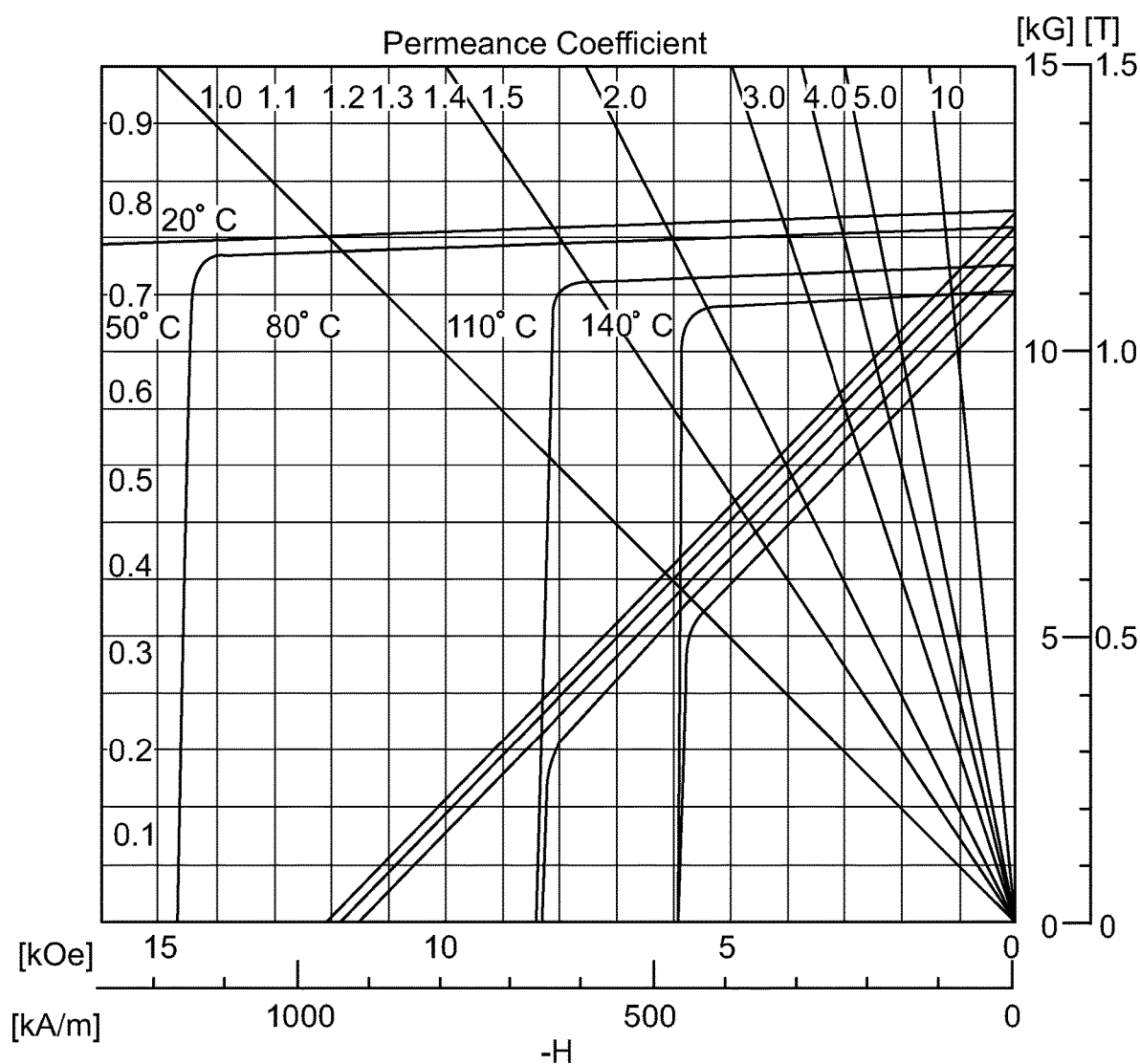
FIG. 2B is a graph that illustrates the conditions upon which a magnet becomes demagnetized.
Figure 3A:
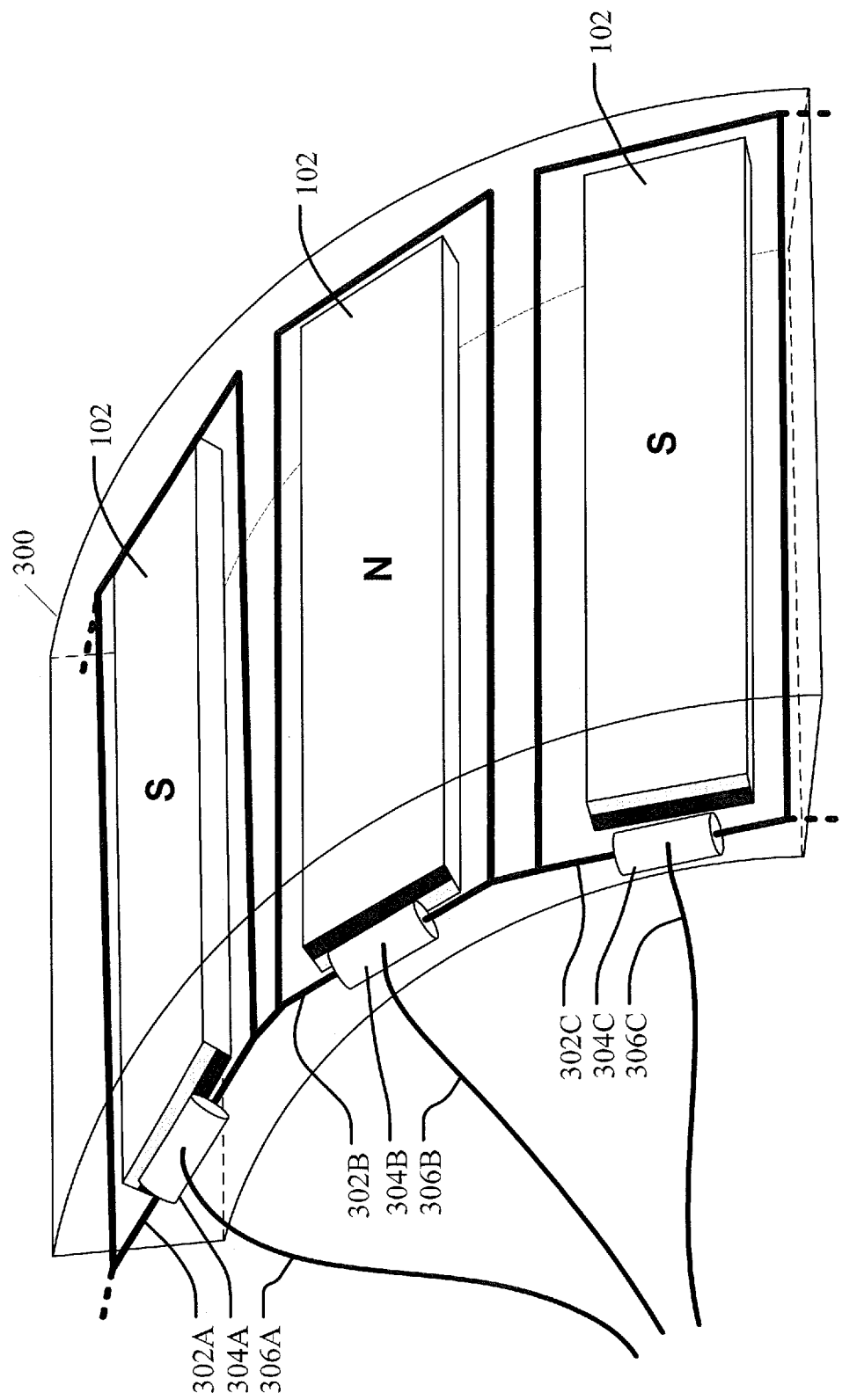
FIGS. 3A and 3B illustrate sections of exemplary rotors for a permanent magnet electrical machine with a hybrid cage according to embodiments of the subject matter described herein.
Figure 3B:
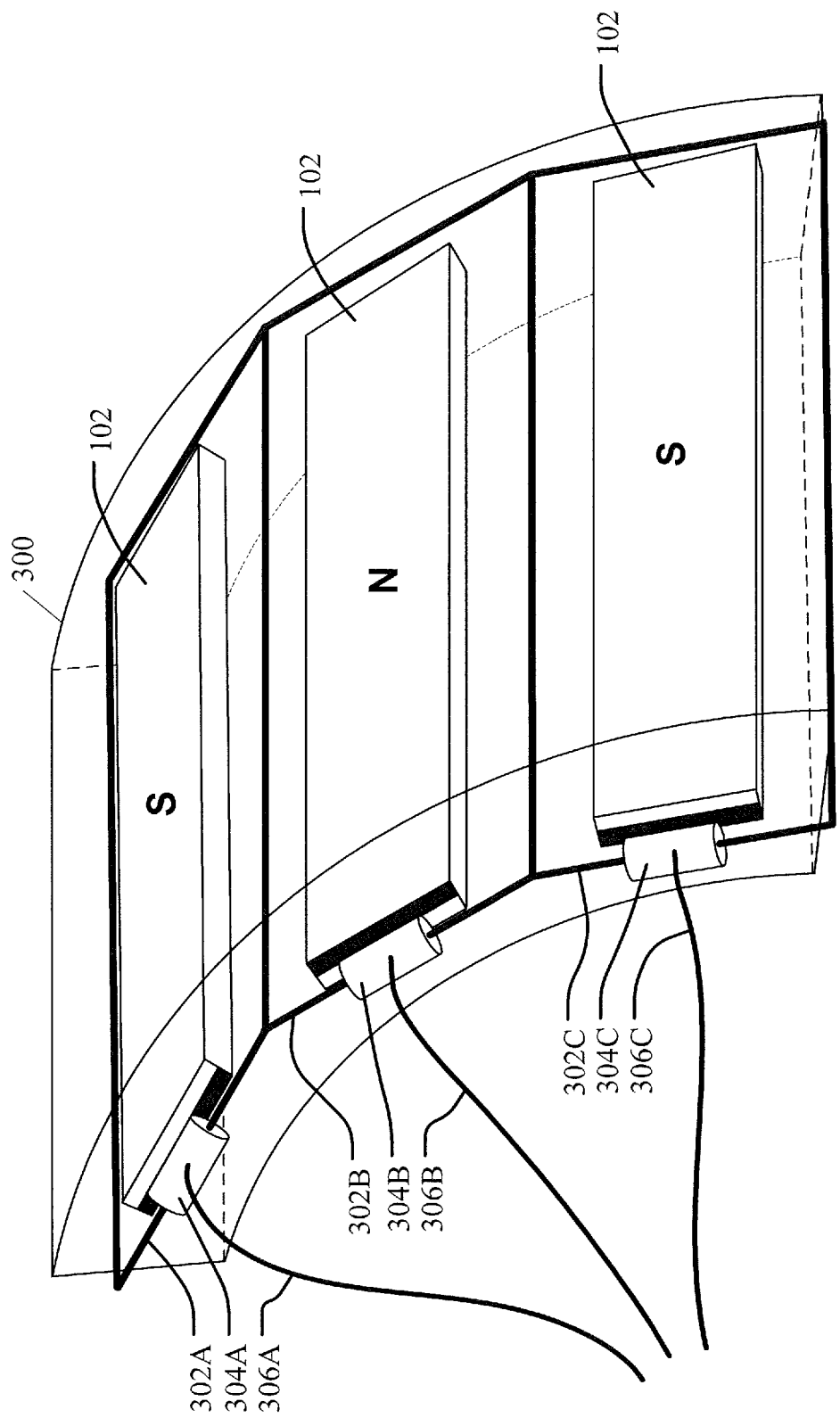

FIGS. 3A and 3B illustrate sections of exemplary rotors for a permanent magnet electrical machine with a hybrid cage according to embodiments of the subject matter described herein.

FIG. 3A illustrates a section of a rotor 300 having magnets 102 that are surrounded by conductive paths 302A, 302B, and 302C, which are herein collectively referred to as conductive paths 302. Each conductive path includes a switching device 303A, 303B, 303C, where are herein collectively referred to as switching devices 303. The combination of conductive paths 302 and switching devices 303 create a hybrid cage around rotor 300.

In one mode of operation, switching devices 304 electrically conduct, forming a closed circuit loop around each magnet 102. In another mode of operation, switching devices 304 do not electrically conduct, breaking the closed circuit loop around each magnet 102, i.e., causing an open circuit. In the embodiment illustrated in FIG. 3A, each switching device has its own respective control input 306A, 306B, and 306C, where are herein collectively referred to as control inputs 306. In one embodiment, each switching device may be controlled individually. In another embodiment, switching devices 304 may be controlled as a group.

Thus, in the embodiment illustrated in FIG. 3A, conductive paths 302 form conductive loops around each magnet 102, and each loop is controllable to be an open circuit or a closed circuit. In the embodiment illustrated in FIG. 3A, all loops are connected together electrically on the right side of each loop. FIG. 3A illustrates an embodiment in which the conductive paths are positioned relatively close to the periphery of its respective permanent magnet.

In one embodiment, a controller may produce the control inputs 304 according to whether having a closed loop is desired, such as during startup or a fault condition, or having an open loop is desired, such as during normal operation of the machine. Example switching devices 304 include but are not limited to diodes, silicon-controlled rectifiers (SCRs), metal oxide semiconductor field effect transistors (MOSFETs), insulated gate bipolar transistors (IGBTs), mechanical relays, or any other type of switch. Embodiments which use diodes, for example, have the added benefit that no control inputs 306 are needed, which simplifies design and construction. By providing a cage that implements a closed loop, the eddy current losses are forced to the cage elements, with the result that, during short circuits, the magnet does not experience the kind of significant local heating that may lead to damage. The presence of a conducting loop, in other words, helps the magnet remain healthy. Such protection is particularly beneficial for magnets that contain NdFeB, Ferrite, SmCo, or Alnico.

FIG. 3B illustrates another version of the hybrid cage structure shown in FIG. 3A, except that each loop shares a conductive path with the loop on either side of it. In the embodiment illustrated in FIG. 3B, there is only one conductor between each pair of magnets 102, rather than the pair of conductors shown in FIG. 3A. In the embodiment illustrated in FIG. 3B, switching devices 304 are located at one end of rotor 300, but other configurations are contemplated. For example, there could be switching devices at the other end, at both ends, or even along the conductive paths that run between and parallel to the magnets. In other words, switching devices 304 may be located anywhere along the conducting loop such that they can controllably create an open circuit or a closed circuit.

Figure 4B:
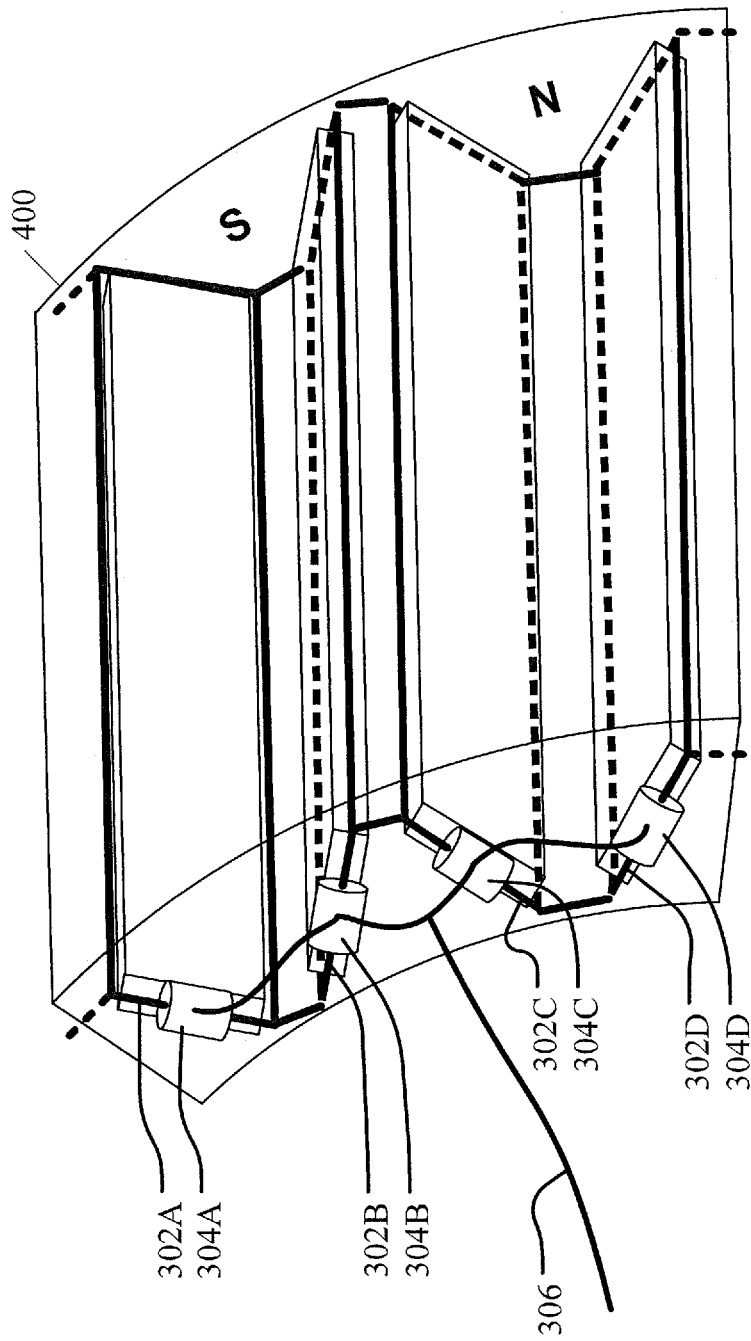

FIGS. 4A and 4B illustrate sections of exemplary rotors for a permanent magnet electrical machine with a hybrid cage according to other embodiments of the subject matter described herein.

FIG. 4A illustrates a section of a rotor 400 that contains conductive paths 302 that surround and circumscribe each rotor magnetic pole. The conductive paths 302 and switching devices 304 comprise the hybrid cage. This illustrates the principle that the controllable conductive paths that surround the rotor magnetic poles may surround multiple magnets, or magnets a variety of configurations. This configuration is herein referred to as a "loop per pole" topology. In the embodiment illustrated in FIG. 4A, each of the switching devices 304 require a control input 306, but in another embodiment the hybrid cage may use switching devices, such as diodes, that do not require control inputs. The circuit topology of the cage shown in FIG. 4A differs from the one shown in FIG. 3A in that in FIG. 3A, each loop is connected to adjacent loops on only one side, i.e., the side of the loop closest to switching devices 304, while in FIG. 4A, each loop is connected to adjacent loops on two sides. The topology shown in FIG. 4A creates closed loops between each pole, but the effect of these loops on the efficiency of the machine may be negligible, depending on the actual dimensions, etc.

FIG. 4B shows another variation of a hybrid cage comprised of conductive paths 302 and switching devices 304 in which individual magnets have their own controllable loop, herein referred to as a "loop per magnet" topology. FIG. 4B also illustrates the principle that multiple loops may be controlled by a single control signal 306.

Figure 5A:
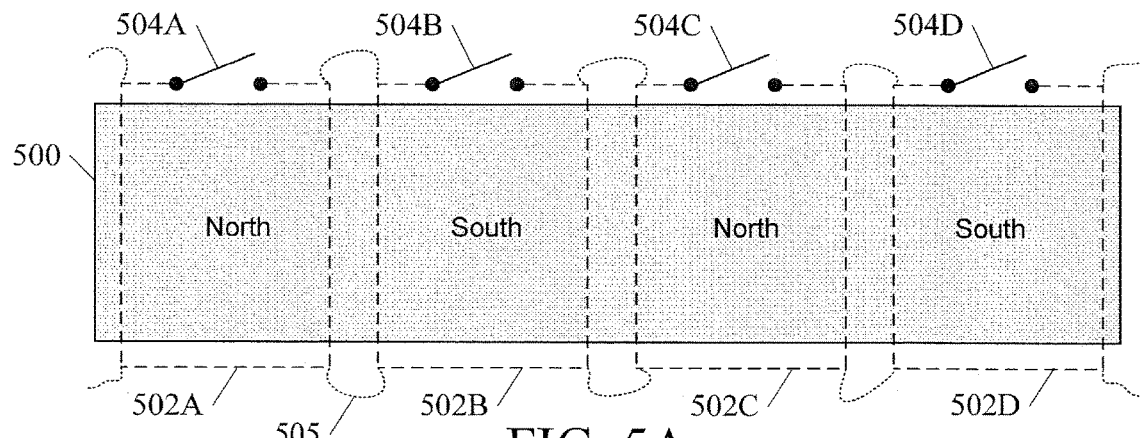
FIGS. 5A, 5B, and 5C illustrate circuit topologies of rotors with hybrid cages according to embodiments of the subject matter described herein.
Figure 5B:
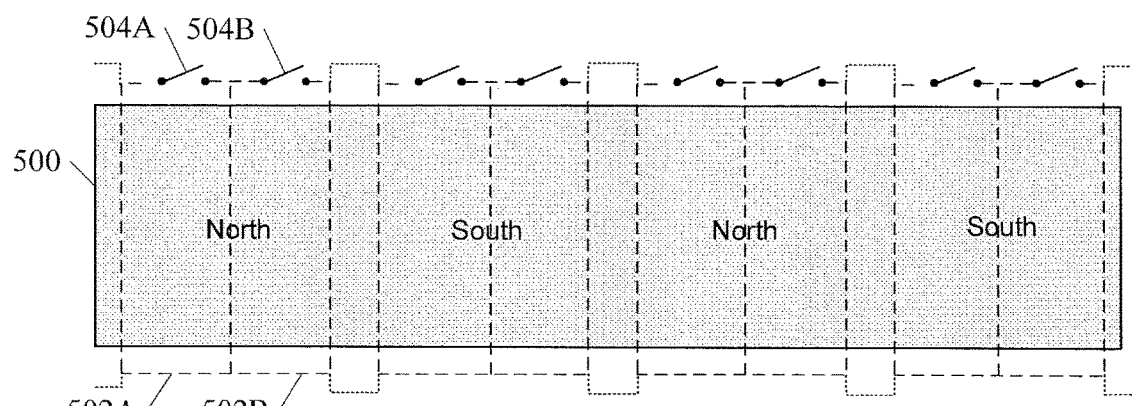
Figure 5C:
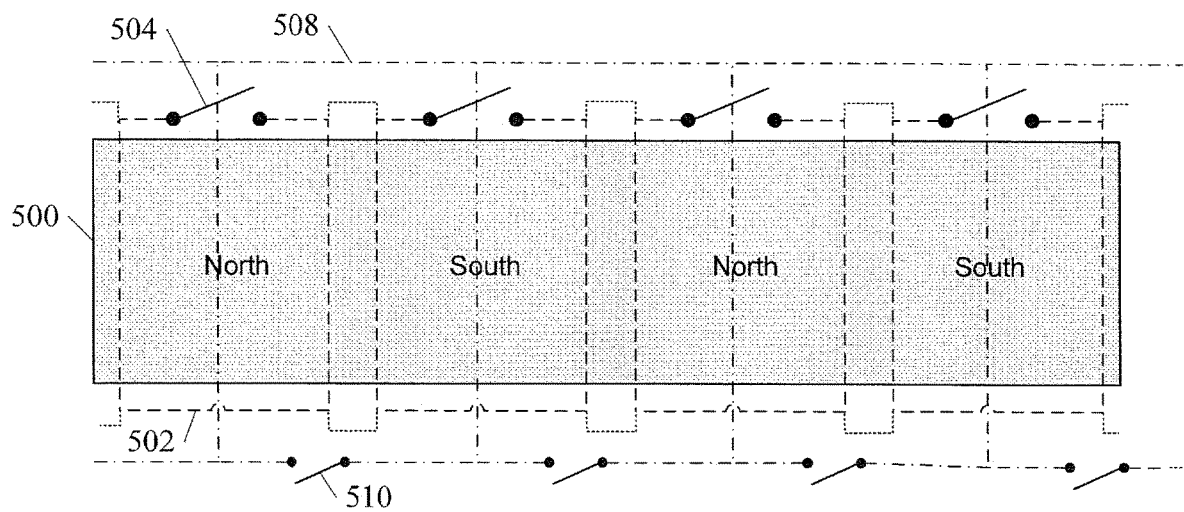

In addition to the various physical configurations of magnets, conductive paths, switches, etc. that are contemplated by the instant application, multiple electrical configurations are contemplated. FIGS. 5A through 5C show a few examples of the many electrical or circuit topologies that are possible according to embodiments of the subject matter described herein.

FIG. 5A illustrates the circuit of a hybrid cage according to one embodiment of the subject matter described herein. For simplicity, the "unrolled" surface of rotor 500 is shown in a two-dimensional representation. The left edge of rotor 500 would be joined to the right edge of rotor 500 to form the cylindrical surface of a three-dimensional rotor. The dashed and dotted lines indicate conducting loops 502A, 502B, 502C, and 502D, which are herein collectively referred to as conducting loops 502. In one embodiment, the dashed lines indicate the presence of a physical conductor separate from the rotor body while the dotted lines indicate a conductive path through the rotor body, either through a conductor embedded or cast within the rotor body or through the rotor body itself, if the rotor body is made of an electrically conductive material. Each dotted or dashed line may represent a single conductor or multiple conductors. The pair of dashed lines between each pair of magnetic poles may be a single conducting path instead of the pair of conducting paths as shown. There may be a number of conductors axially passing through the rotor, which may or may not be connected based on specific constructions, as well as current and voltage ratings.

In the embodiment illustrated in FIG. 5A, switching devices 504A, 504B, 504C, and 504D, which are herein collectively referred to as switching devices 504, a located at one end of rotor 500. Switching devices 504 are closed on command to form conductive loops that surround each rotor magnetic pole, shown as labels "North" and "South" to indicate the direction of the magnetic pole. Each magnetic pole projects normal to the surface of rotor 500, i.e., toward the viewer. The embodiment illustrated in FIG. 5A provides a controllably conductive loop around each rotor magnetic pole. Each pole may be created by a single magnet, as shown in FIG. 3A, or by multiple magnets, as shown in FIG. 4A.

FIG. 5B illustrates a hybrid cage according to another embodiment of the subject matter described herein. The embodiment illustrated in FIG. 5B may be used with rotors where each pole is made of multiple magnet sections, such as shown in FIG. 4B. In this manner each magnet section may be separately protected. This circuit construction may be used with a variety of rotor designs, especially where a rotor magnetic pole is created a magnet assembly constructed of multiple individual magnet segments, which may be individually protected by this cage concept. The choice of number of coils would depend upon voltage and currents induced, which would largely depend upon size of the machine, e.g., via application of faraday's law.

FIG. 5C illustrates a hybrid cage according to yet another embodiment of the subject matter described herein. The embodiment illustrated in FIG. 5C provides separate cages and circuits for protection of a given portion of magnet or for dynamic sequencing of the cages. In this embodiment, a first cage 502 is shown as dashed or dotted lines and a second cage 508 is indicated using lines with a "dash-dot-dash-dot" pattern. First cage 502 includes a first set of switching devices, only one of which is labeled as switching device 504. First cage 510 includes its own, separate set of switching devices, only one of which is labeled as switching device 510. In one embodiment, one cage may provide protection in one direction and another cage may provide protection in another direction. For example, second cage 508 may provide additional protection along the q-axis.

For all circuit topologies, including those shown in FIGS. 5A-5C and also including circuit topologies not shown, all circuits may be connected in multiple series and parallel paths, including multiple conductive turns about a single magnet or magnet assembly to attain preferable current and voltage characteristics. These characteristics would be determined by the geometry of the machine, as well as the current, voltage, and other ratings of the devices in which open and close the cage circuits.

Figure 6:
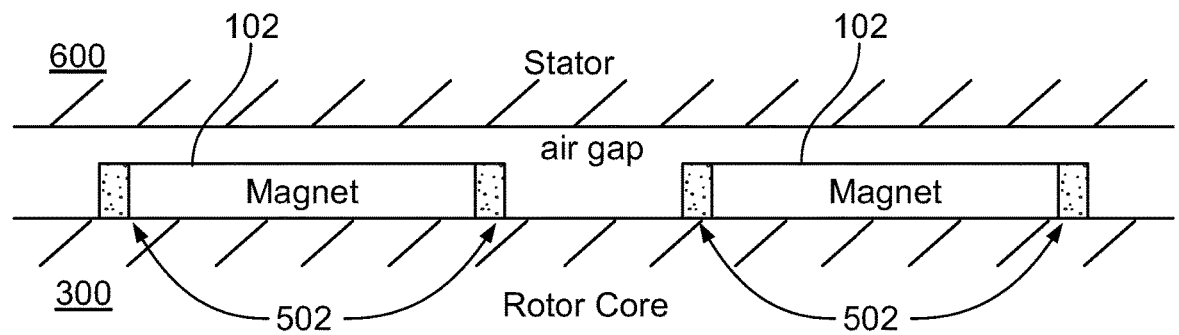
FIGS. 6 through 10B illustrate cross sections of exemplary permanent magnet electrical machines having a hybrid cage according to embodiments of the subject matter described herein.

FIG. 6 illustrates a hybrid cage according to yet another embodiment of the subject matter described herein. FIG. 6 illustrates a cross section of a surface magnet type motor, having a stator 600 and a rotor 300 separated by an air gap. Magnets 102 are positioned on the outer surface of rotor 300. The text 'magnet' is oriented such that the magnet would be oriented in the direction of reading of the text. Each magnet is surrounded by a cage 502 having conductors seen in cross section as shaded boxes. In the embodiment illustrated in FIG. 6, the conductors that make up the cage are located in close proximity to the magnets, and thus resembles the embodiment illustrated in FIG. 3A and the circuit shown in FIG. 5A.

Figure 7:
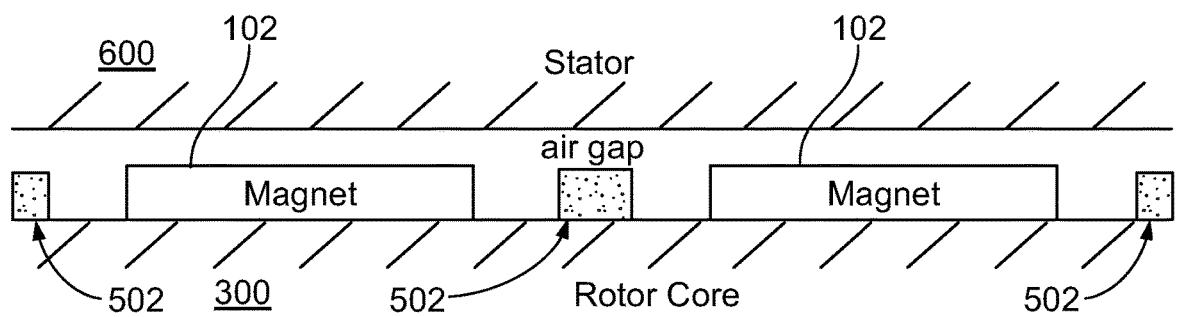

FIG. 7 illustrates a hybrid cage according to yet another embodiment of the subject matter described herein. The embodiment illustrated in FIG. 7 is similar to the embodiment illustrated in FIG. 6, except that a single conductor shared between each pair of magnets 102, and thus resembles the embodiment illustrated in FIG. 3B. This construction uses fewest parts, which possibly protecting the magnets to the greatest degree from air gap field variations for this rotor construction.

Figure 8:
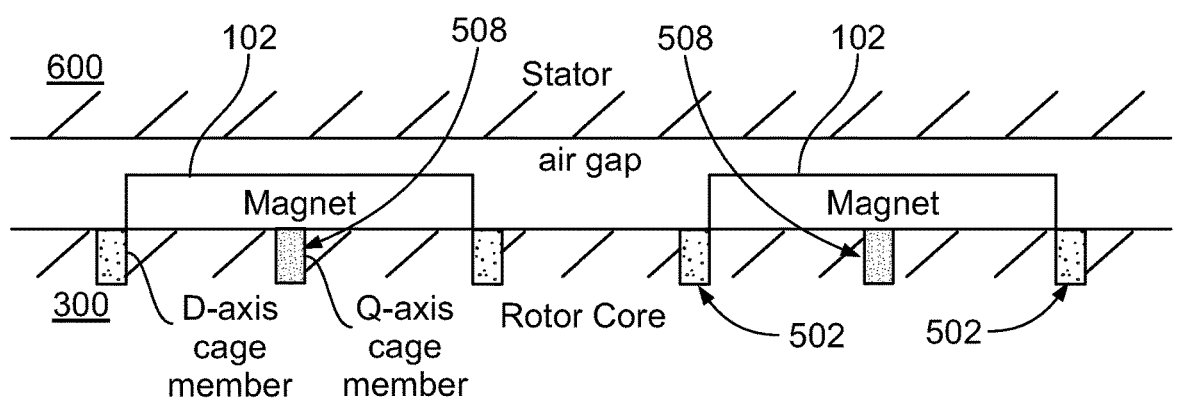

FIG. 8 illustrates a hybrid cage according to yet another embodiment of the subject matter described herein. The embodiment illustrated in FIG. 8 is also similar to the embodiment illustrated in FIG. 6, except that cage 502 is embedded within the body of rotor 300, e.g., within the laminations that make up the rotor core. This configuration is well suited for higher speed machines, since the conductors are securely held into place by the rotor laminations.

FIG. 8 also illustrates the presence of a second cage located along the q-axis and thus resembles the circuit shown in FIG. 5C.

Figure 9A:
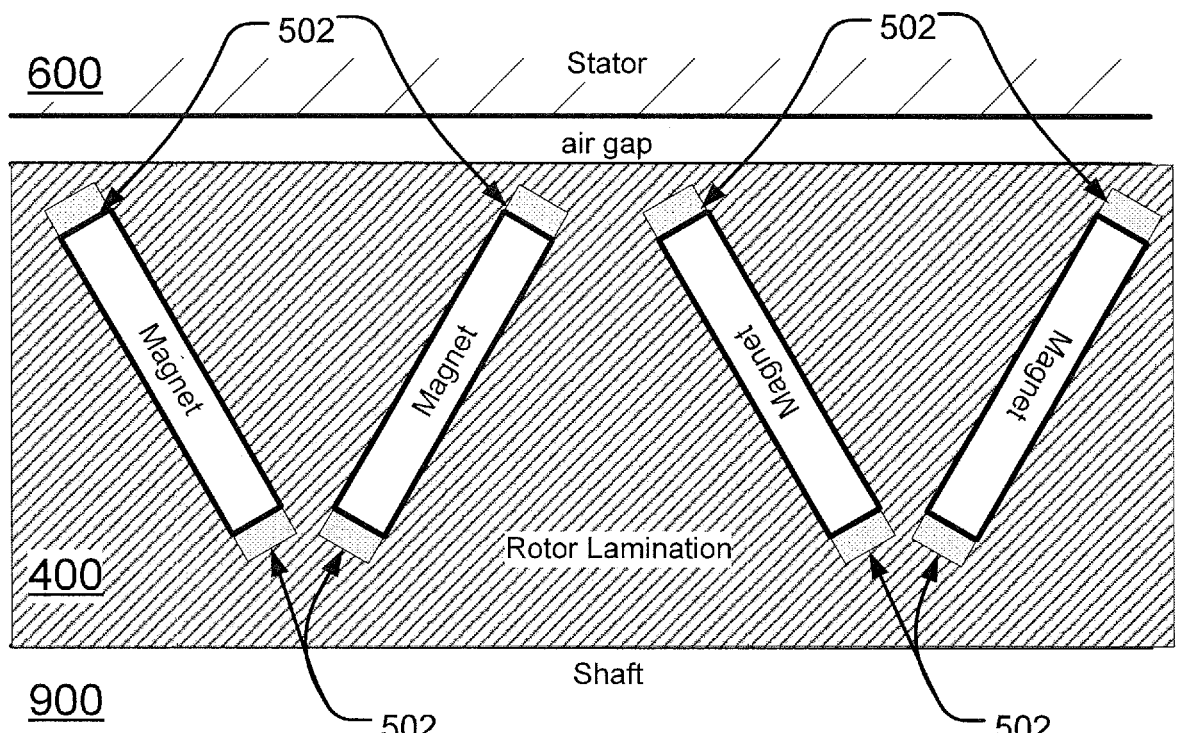
Figure 9B:
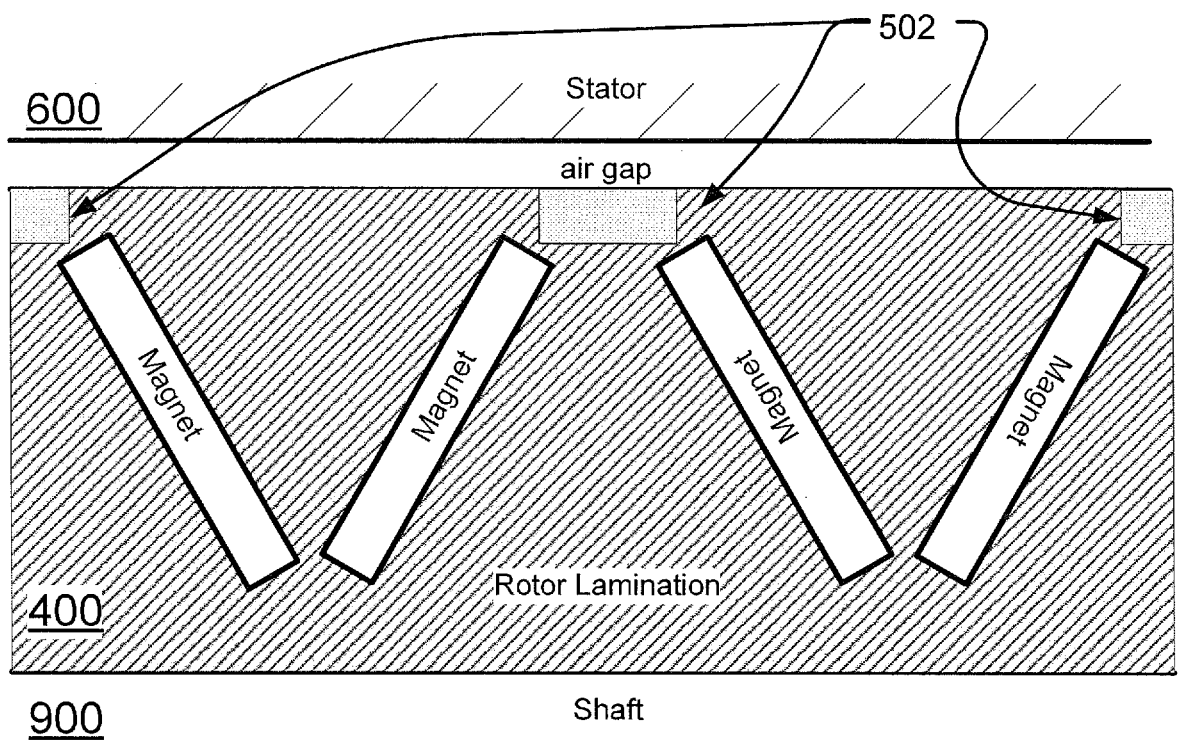

FIGS. 9A and 9B illustrate a hybrid cage according to yet another embodiment of the subject matter described herein. FIGS. 9A and 9B illustrate cross sections of motor having a stator 600 and a rotor 400 attached to a shaft 900, where the laminations of rotor 400 contain 'V' mounted or embedded magnets. In the embodiment illustrated in FIG. 9A, conductors of cage 502 are in close proximity to the magnets. For example, the bars may be connected in circuits that encompass each magnet, such as shown in FIG. 4B. In the embodiment illustrated in FIG. 9B, conductors of cage 502 are located in close proximity to the magnets, but only on the side of the magnets that are close to the air gap, such as shown in FIG. 4A. Benefits of this embodiment include lower cost due to the fact that this construction uses fewest parts, and the additional benefit that it may give to the magnets a greater degree of protection from air gap field variations.

Figure 10A:
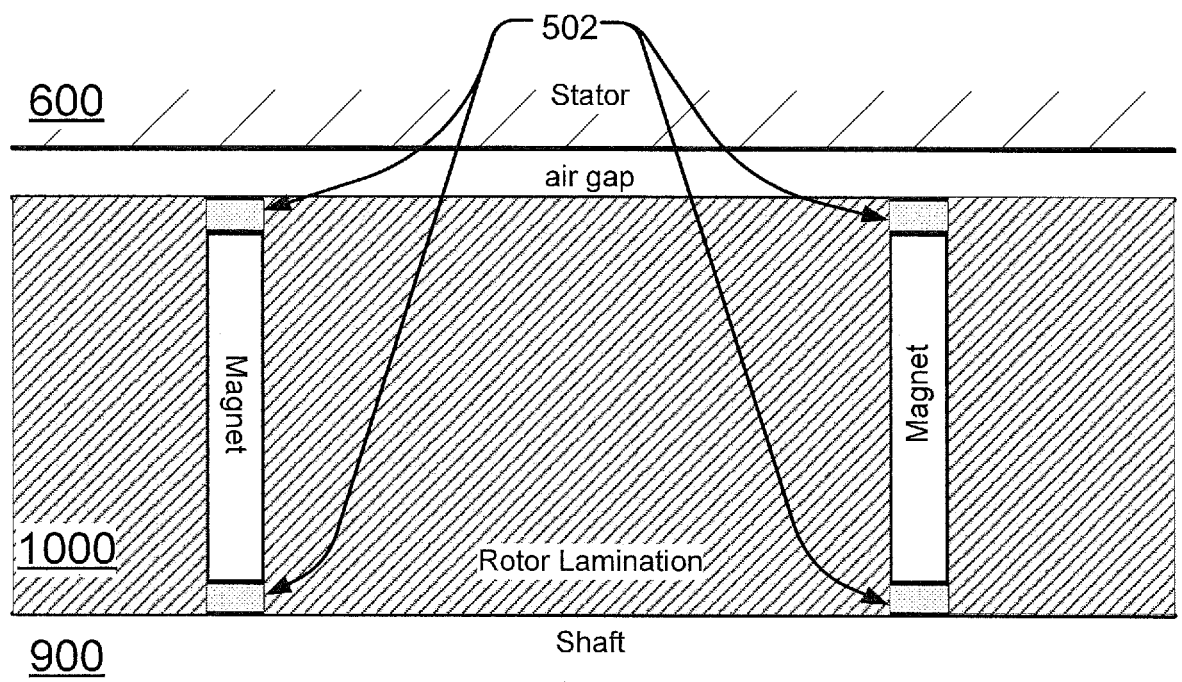
Figure 10B:
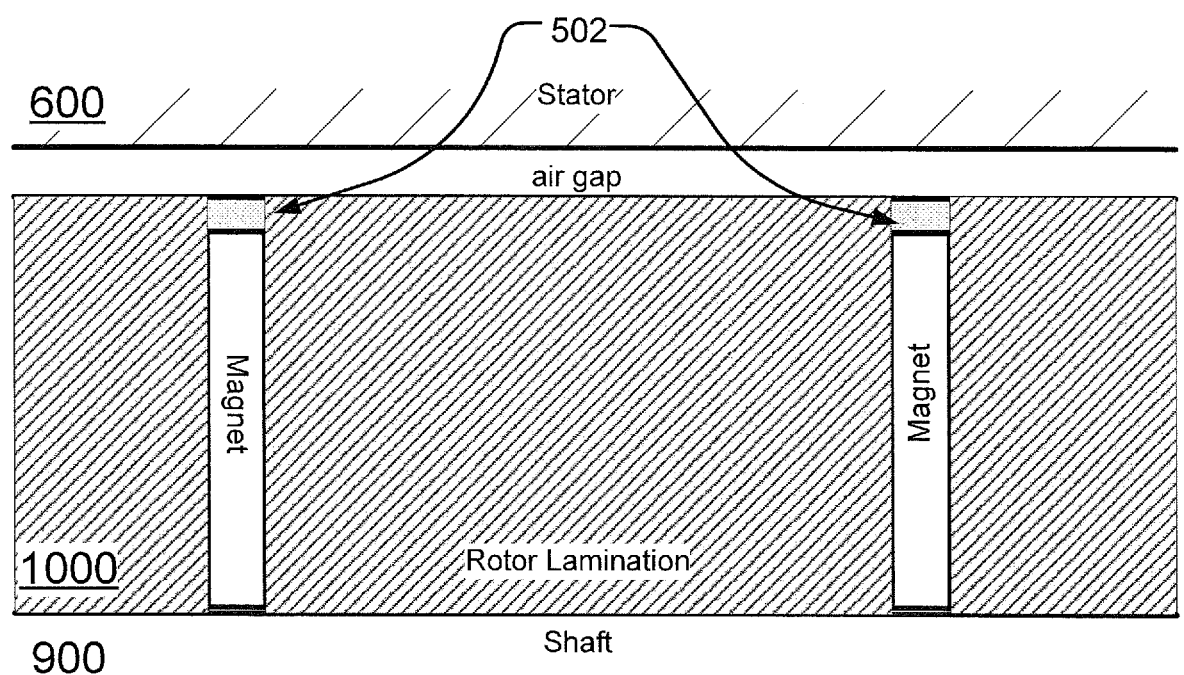

FIGS. 10A and 10B illustrate a hybrid cage according to yet another embodiment of the subject matter described herein. FIGS. 10A and 10B illustrate cross sections of motor having a stator 600 and a rotor 100 attached to a shaft 900, where the laminations of rotor 1000 contain 'spoke' mounted or embedded magnets. In the embodiment illustrated in FIG. 10A, conductors of cage 502 are in close proximity to the magnets. For example, the bars may be connected in circuits that encompass each magnet. In the embodiment illustrated in FIG. 10B, conductors of cage 502 are located in close proximity to the magnets, but only on the side of the magnets that are close to the air gap.

The conductors or bars of the hybrid cage may be of any shape, cross-section, etc., as appropriate. For example, the short circuiting bars may be of many different shapes, due to cross section constraints of minimizing leakage flux during normal operation and under active cage events, as well as structural and manufacturing considerations.

The figures above illustrate the application of a hybrid cage in a rotor having magnetic poles that project radially outward from the surface of the rotor, but the subject matter described herein is not limited to radial flux machines. The concepts and principles disclosed herein may be applied to other types of machines, including axial flux and transverse flux permanent magnet machines. Regardless of the orientation of the rotor magnetic poles—radial, axial, transverse, etc.,—a hybrid cage may be provided that implements a controllably conductive loop around the magnetic poles.

Figure 11:
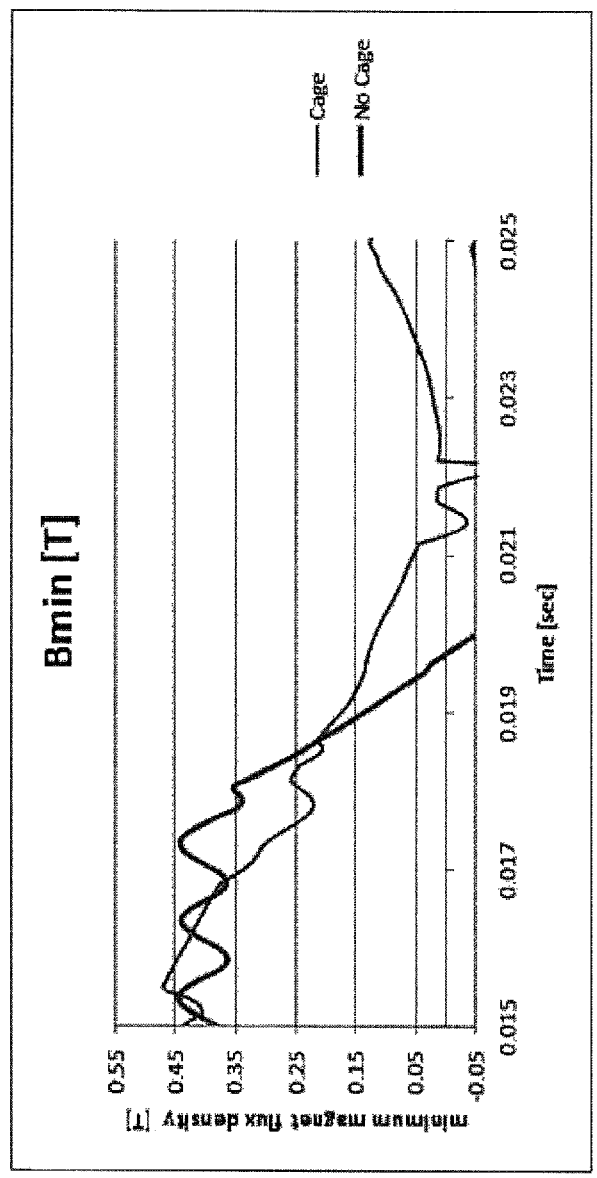
FIG. 11 is a graph showing the benefits of a protective hybrid cage according to an embodiment of the subject matter described herein.

FIG. 11 is a graph showing the benefits of a protective cage. FIG. 11 illustrates the flux density within a permanent magnet of a rotor with a cage (thin line) and without a cage (thick line) during the course of a large change in flux density generated by a stator. As shown in FIG. 11, the magnet flux density [T] drops in response to the external field, and that this drop occurs very quickly, during a 10 microsecond window. The flux density of the magnet or portions of the magnet not protected by a cage becomes strongly negative after just 5 microseconds, and does not recover after the external field is removed, 5 microseconds after that—i.e., the magnet has suffered some demagnetization as a result of exposure to the external field. The magnet that is protected by the cage, on the other hand, also suffers a loss of flux density, but not as great a loss as suffered by the unprotected magnet.

Figure 12:
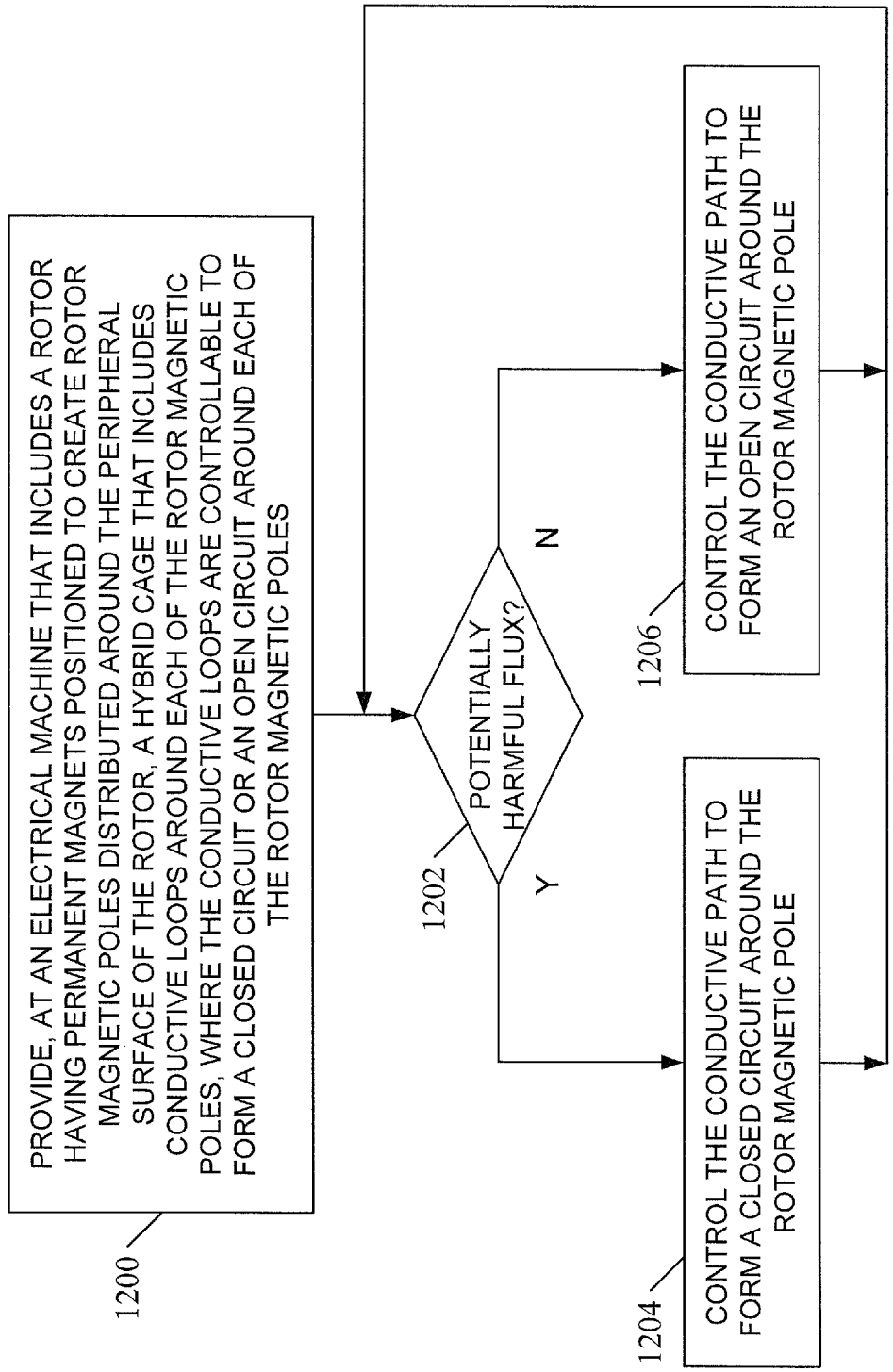
FIG. 12 is flow chart illustrating an exemplary process for operating a permanent magnet electrical machine with a hybrid cage according to an embodiment of the subject matter described herein.

FIG. 12 is flow chart illustrating an exemplary process for operating a permanent magnet electrical machine with a hybrid cage. At a permanent magnet electrical machine that includes a stator having a central axis and a plurality of windings for generating a rotating field of stator magnetic poles, a rotor having a central axis which coincides with the central axis of the stator, the rotor including a plurality of permanent magnets positioned to create a plurality of rotor magnetic poles distributed around a peripheral surface of the rotor:

At step 1200, provide, at an electrical machine that includes a rotor having a plurality of permanent magnets positioned to create a plurality of rotor magnetic poles distributed around a peripheral surface of the rotor, a hybrid cage comprising conductive loops around each of the rotor magnetic poles, wherein the conductive loops are controllable to form a closed circuit or an open circuit around each of the rotor magnetic poles. The rotor magnetic poles may be created by one or more permanent magnets. In one embodiment, the conductive loops individually surround each of the one or more permanent magnets that create the rotor magnetic pole. In another embodiment, each of the conductive loops surrounds an assembly of permanent magnets that collectively create the rotor magnetic pole. In one embodiment, some but not all of the rotor magnetic poles are surrounded by its own conductive loop.

At step 1202, determine whether a magnetic field having a field strength that exceeds a threshold magnitude is present, e.g., determine whether the rotor magnetic pole is being subject to a potentially harmful level of magnetic flux.

At step 1204, in response to the presence of a magnetic field having a field strength or change in field strength that exceeds a threshold magnitude (e.g., in response to determining that the rotor magnetic pole is being subject to a potentially harmful level of magnetic flux), control the conductive path to form a closed circuit around the rotor magnetic pole.

At step 1206, in response to the absence of a magnetic field having a field strength or change in field strength that exceeds a threshold magnitude (e.g., in response to determining that the rotor magnetic pole is not being subject to a potentially harmful level of magnetic flux), control the conductive path to form an open circuit around the rotor magnetic pole.

The process then returns to step 1202, repeating as necessary to protect the rotor magnetic pole from potentially harmful conditions when they occur and breaking the circuit of the conductive loop and thus improving the efficiency of the permanent magnet electrical machine when potentially harmful conditions are not present.

There are a number of circumstances which may give rise to the rotor magnetic pole being subject to potentially harmful levels of magnetic flux. For example, the failure of a stator coil, stator coil controller, or stator coil power supply could cause a fault condition in which the rotor magnetic poles are subject to a magnetic field having a field strength that exceeds a threshold value. A mechanical failure of the machine could likewise cause the presence of potentially harmful levels of magnetic flux.

There are several ways to determine whether a rotor magnetic pole is or is not being subject to a potentially harmful level of magnetic flux, including monitoring for failure of stator coils, controllers, or power supplies, and direct monitoring of magnetic field strength, such as via the use of Hall effect transistors for direct measurement of fields and monitor coils for indirect measurement of fields in and around the poles, as well as sensing on stator windings, etc.

The measurement may be made from either the rotor itself or from stationary mounted devices or sensors, from which signals are conveyed to device triggering circuit(s).

In addition to the hybrid cage structures described above, additional protection may be provided by the inclusion of a thermally insulating material between the cage and the permanent magnets to reduce propagation of thermal energy from the cage to the magnets.

It will be understood that various details of the subject matter described herein may be changed without departing from the scope of the subject matter described herein. Furthermore, the foregoing description is for the purpose of illustration only, and not for the purpose of limitation.

What is claimed is:

1. A rotor and hybrid cage for an electrical machine, the rotor comprising:
    a rotor body having a central axis and including a plurality of permanent magnets positioned to create a plurality of rotor magnetic poles distributed around a peripheral surface of the rotor; and
    a hybrid cage comprising a plurality of conductive loops distributed circumferentially around the rotor body, each conductive loop surrounding and circumscribing a permanent magnet for a corresponding rotor magnetic pole, each conductive loop including a switching device, a first conductor, and a second conductor, the first conductor spaced apart from the second conductor disposed adjacent to the first conductor; wherein the permanent magnet of the corresponding rotor magnetic pole is disposed between the adjacent first and second conductors;
    wherein the switching device of each conductive loop is positioned and adapted to, in response to a permanent magnet for the corresponding rotor magnetic pole being subject to a first level of magnetic flux, form, via the corresponding conductive loop, a closed circuit around the corresponding rotor magnetic pole, and further positioned and adapted to, in response to the permanent magnet for the corresponding rotor magnetic pole being subject to a second level of magnetic flux, form, via the corresponding conductive loop, an open circuit around the corresponding rotor magnetic pole, the second level of magnetic flux being different than the first level of magnetic flux.

2. The rotor of claim 1, wherein the switching device of each conductive loop does not receive a control input from a controller.

3. The rotor of claim 1, wherein the switching device of each conductive loop comprise at least one of a silicon controlled rectifier, an insulated gate bipolar junction transistor, a metal oxide semiconductor, a field effect transistor, a mechanical switch, and an electromechanical switch.

4. The rotor of claim 1 comprising a control circuit for controlling the switch device of the conductive loops to form closed circuits or open circuits around the rotor magnetic poles.

5. The rotor of claim 1 wherein at least one of the conductive loops circumscribes a magnetic pole created by a plurality of permanent magnets.

6. The rotor of claim 1 wherein at least one of the plurality of permanent magnets is comprised of NdFeB, Ferrite, SmCo, or Alnico.

7. The rotor of claim 1 wherein the switch device of each of the conductive loops controlled to form a closed circuit around each of the rotor magnetic poles in response to the presence of a magnetic field having a field strength or change in field strength that exceeds a threshold magnitude.

8. The rotor of claim 1 wherein the conductive loops are controlled to form an open circuit around each of the rotor magnetic poles in response to the absence of a magnetic field having a field strength or change in field strength that exceeds a threshold magnitude.

9. The rotor of claim 1 wherein the rotor magnetic poles are radially, axially, or transversely oriented relative to the rotor.

10. The rotor of claim 1 comprising a thermally insulating material for thermally insulating the conductors of the hybrid cage from the rotor permanent magnets to reduce propagation of thermal energy from the cage to the magnets.

11. The rotor and hybrid cage of claim 1, wherein the conductive loops are constructed to protect the permanent magnets from damage.

12. An electrical machine with a hybrid cage, the machine comprising:
    a stator having a central axis and a plurality of windings for generating a rotating field of stator magnetic poles; and
    a rotor having a central axis which coincides with the central axis of the stator, the rotor including a plurality of permanent magnets positioned to create a plurality of rotor magnetic poles distributed around a peripheral surface of the rotor and a hybrid cage comprising a plurality of conductive loops distributed circumferentially around the rotor, each conductive loop surrounding and circumscribing a permanent magnet for a corresponding rotor magnetic pole, each conductive loop having a switching device, a first conductor, and a second conductor, the first conductor spaced apart from the second conductor disposed adjacent to the first conductor; wherein the permanent magnet of the corresponding rotor magnetic pole is disposed between the adjacent first and second conductors;
    wherein the switching device of each conductive loop is positioned and adapted to, in response to a permanent magnet for the corresponding rotor magnetic pole being subject to a first level of magnetic flux, form, via the conductive loop, a closed circuit around the corresponding rotor magnetic pole, and is further positioned and structure to, in response to the permanent magnet for the corresponding rotor magnetic pole being subject to a second level of magnetic flux, form, via the conductive loop, an open circuit around the corresponding rotor magnetic pole, the second level of magnetic flux being different than the first level of magnetic flux.

13. The machine of claim 12, wherein the switching device does not receive a control input from a controller.

14. The machine of claim 12 wherein the switching device comprises at least one of a silicon controlled rectifier, an insulated gate bipolar junction transistor, a metal oxide semiconductor, a field effect transistor, a mechanical switch, and an electromechanical switch.

15. The machine of claim 12 comprising a control circuit for controlling the switch device of each of the conductive loops to form closed circuits or open circuits around the rotor magnetic poles.

16. The machine of claim 12 wherein at least one of the conductive loops circumscribes a magnetic pole created by a plurality of permanent magnets.

17. The machine of claim 12 wherein at least one of the plurality of permanent magnets is comprised of NdFeB, Ferrite, SmCo, or Alnico.

18. The machine of claim 12 wherein the conductive loops are controlled to form a closed circuit around each of the rotor magnetic poles in response to the presence of a magnetic field having a field strength or a change of field strength that exceeds a threshold magnitude.

19. The machine of claim 12 wherein the conductive loops are controlled to form an open circuit around each of the rotor magnetic poles in response to the absence of a magnetic field having a field strength or a change of field strength that exceeds a threshold magnitude.

20. The machine of claim 12 wherein the rotor magnetic poles are radially, axially, or transversely oriented relative to the rotor.

21. The machine of claim 12 wherein the rotor includes a thermally insulating material or thermally insulating the conductors of the hybrid cage from the rotor permanent magnets to reduce propagation of thermal energy from the cage to the magnets.

22. The electrical machine of claim 12, wherein the conductive loops are constructed to protect the permanent magnets from damage during a change in flux density generated by the stator.

23. A method for operating a permanent magnet electrical machine with a hybrid cage, the method comprising:

providing, at an electrical machine that includes a rotor having a plurality of permanent magnets positioned to create a plurality of rotor magnetic poles distributed around a peripheral surface of the rotor, a hybrid cage comprising a plurality of conductive loops distributed circumferentially around the rotor, each conductive loop surrounding and circumscribing a permanent magnet for a corresponding rotor magnetic pole, each conductive loop having a switching device, a first conductor, and a second conductor, the first conductor spaced apart from the second conductor disposed adjacent to the first conductor; wherein the permanent magnet of the corresponding rotor magnetic pole is disposed between the adjacent first and second conductors; and wherein each of the conductive loops are, via operation of the corresponding switching device, operable to form a closed circuit or an open circuit around each of the rotor magnetic poles;

closing, via operation of the switching device, the corresponding conductive paths to form a closed circuit around the corresponding rotor magnetic poles in response to a determination that a permanent magnet for the corresponding rotor magnetic pole is subject to a first level of magnetic flux; and opening, via operation of the switching device, the corresponding conductive paths to form an open circuit around the corresponding rotor magnetic poles in response to a determination that the permanent magnet for the corresponding rotor magnetic pole is subject to the first level of magnetic flux.

24. The method of claim 23, wherein the closing and opening of the conductive loops occurs without the switching device receiving a control input from a controller.

25. The method of claim 23, wherein the conductive paths are controlled to form the closed circuit around each of the rotor magnetic poles in response to the presence of a magnetic field having a field strength that exceeds a threshold magnitude; and wherein the conductive paths are controlled to form the open circuit around each of the rotor magnetic poles in response to the absence of a magnetic field having a field strength that exceeds a threshold magnitude.

26. A non-transitory computer readable medium having stored thereon executable instructions that when executed by the processor of a computer control the computer to perform steps comprising:

at an electrical machine that includes a rotor having a plurality of permanent magnets positioned to create a plurality of rotor magnetic poles distributed around a peripheral surface of the rotor and a hybrid cage comprising a plurality of conductive loops distributed circumferentially around the rotor, each conductive loop surrounding and circumscribing a permanent magnet for a corresponding rotor magnetic pole, each conductive loop having a switching device, a first conductor, and a second conductor, the first conductor spaced apart from the second conductor disposed adjacent to the first conductor; wherein the permanent magnet of the corresponding rotor magnetic pole is disposed between the adjacent first and second conductors; and wherein each of the conductive loops are, via operation of the corresponding switching device, operable to form a closed circuit or an open circuit around each of the rotor magnetic poles:

closing, via operation of the switching device, the corresponding conductive paths to form a closed circuit around the corresponding rotor magnetic poles in response to a determination that a permanent magnet for the corresponding rotor magnetic pole is subject to a first level of magnetic flux; and opening, via operation of the switching device, the corresponding conductive paths to form an open circuit around the corresponding rotor magnetic poles in response to a determination that the permanent magnet for the corresponding rotor magnetic pole is not subject to the first level of magnetic flux.

27. The method of claim 26, wherein the conductive paths are controlled to form a closed circuit around each of the rotor magnetic poles in response to the presence of a magnetic field having a field strength that exceeds a threshold magnitude; and wherein the conductive paths are controlled to form an open circuit around each of the rotor magnetic poles in response to the absence of a magnetic field having a field strength that exceeds a threshold magnitude.

* * * * *